United States Patent [19]

Blanyer et al.

[11] Patent Number: 5,409,787
[45] Date of Patent: Apr. 25, 1995

[54] BATTERY PLATE COMPRESSION CAGE ASSEMBLY

[75] Inventors: Richard J. Blanyer, Smithville; Benny E. Jay, Austin, both of Tex.

[73] Assignee: Electrosource, Inc., Austin, Tex.

[21] Appl. No.: 18,713

[22] Filed: Feb. 17, 1993

[51] Int. Cl.$^6$ ............................................. H01M 2/22
[52] U.S. Cl. .................................... 429/66; 429/152; 429/159; 429/186; 429/208; 29/623.2
[58] Field of Search ............... 29/623.2; 429/186, 54, 429/65, 66, 152, 159, 208

[56] References Cited

U.S. PATENT DOCUMENTS

| | | |
|---|---|---|
| 3,862,861 | 1/1975 | McClelland et al. . |
| 3,941,615 | 3/1976 | McDowall . |
| 4,022,951 | 5/1977 | McDowall . |
| 4,209,575 | 6/1980 | McDowall et al. . |
| 4,239,839 | 12/1980 | McDowall et al. . |
| 4,275,130 | 6/1981 | Rippel et al. . |
| 4,331,747 | 5/1982 | Julian et al. . |
| 4,336,314 | 7/1982 | Yonezu et al. ......................... 429/66 |
| 4,353,969 | 10/1982 | Rippel et al. . |
| 4,421,832 | 12/1983 | Uba . |
| 4,603,093 | 7/1986 | Edwards et al. . |
| 4,637,966 | 1/1987 | Uba et al. . |
| 4,648,177 | 3/1987 | Uba et al. . |
| 4,729,133 | 3/1988 | Oswald ................................... 429/54 |
| 4,874,681 | 10/1989 | Rippel . |
| 4,964,878 | 10/1990 | Morris . |
| 4,973,531 | 11/1990 | Zaima et al. ........................... 429/37 |
| 5,098,800 | 3/1992 | Plichta et al. ......................... 429/112 |
| 5,187,031 | 2/1993 | Heiman et al. ........................ 429/129 |

FOREIGN PATENT DOCUMENTS

| | | |
|---|---|---|
| 1430205 | 3/1976 | Australia . |
| 0251683 | 7/1988 | European Pat. Off. . |
| 1032852 | 6/1966 | United Kingdom . |
| 2070844 | 9/1981 | United Kingdom . |

Primary Examiner—Prince Willis, Jr.
Assistant Examiner—M. Muzzolillo
Attorney, Agent, or Firm—Arnold, White & Durkee

[57] ABSTRACT

This invention relates to method and apparatus for compressing an assembly of plates inside a valve regulated lead-acid battery thereby allowing the battery case to expand without causing slippage or partial loss of contact between the battery plates.

12 Claims, 5 Drawing Sheets

BATTERY PLATE COMPRESSION CAGE ASSEMBLY

BACKGROUND OF THE INVENTION

1. Field of the Invention

This invention relates generally to lead-acid batteries and more especially to sealed lead-acid batteries (SLAB), recombinant and valve regulated lead-acid batteries (VRLAB). More particularly, this invention relates to a system for maintaining intimate plate-to-separator contact during a battery's lifetime.

2. Related Art

Lead-acid battery cells comprise one or more positive plates alternating with one or more negative plates with a separator in between adjacent pairs of plates. The active ingredient on the positive plates is lead dioxide; the active ingredient on the negative plates is spongy lead. A number of materials have been employed as separators. At the present time, separators are typically made of a compressible pad or sponge of an absorptive glass fiber material. This absorptive glass mat (AGM) not only provides electrical separation between the positive and negative plates, it also absorbs and contains the acid electrolyte ($H_2SO_4 + H_2O$) that the cells require for operation.

In order to get each of the adjacent positive and negative plates close together, the plates and separators are assembled with the plates standing and compressed between the walls of the battery. This arrangement compresses the separators. AGMs absorb more electrolyte when compressed. Each AGM has a specific compressive range in which it will absorb a maximum amount of electrolyte. Generally, the AGMs are compressed before the electrolyte is added. With the exception of flooded recombinant batteries, all of the electrolyte in a SLAB provided with AGMs is normally contained in the AGMs, and in the plate pores.

Compressing an AGM separator the optimum amount not only allows the absorption of more electrolyte, it also provides good contact between each separator and its adjacent plates. It is extremely important that each separator completely contact the entire surface area of each adjacent plate. This plate-to-separator contact provides an ionic conduction path between the plates and through the separator.

It has been found that any loss of contact between plate surfaces and separators results in an immediate degradation of cell performance and life. After such a loss of contact, the battery will have a lower discharge capacity, a loss in the number of amps out per square inch of battery plate surface area and increased internal resistance. Such a loss of contact all too often occurs while recharging a lead-acid battery, especially a sealed VRLAB. Lead-acid batteries produce gas during recharge. This is particularly true at a voltage above 2.35 volts per cell, a level that must be reached to fully recharge a lead-acid battery.

Since a VRLAB is sealed, the battery case traps the gas produced during recharge permitting no means of escape, except a safety valve. The increasing volume of gas increases the gas pressure within the battery case. The increased gas pressure, even below the pressure required for release by the safety valve, expands the battery case. Such expansion frequently causes a loss of contact between the plate surfaces and the separator surfaces. This loss of contact can cause an immediate degradation of cell performance and life.

Numerous attempts have been made to prevent case expansion. These attempts have included providing ribs on the battery case or thickening the walls of the case. These attempts, however, have not completely solved the problem; moreover, they add undesirable weight and cost to the battery.

Expansion of the battery case is not the only problem gassing causes. Bubbles rising in between standing plates contact the active material on the plates. This contact strains and loosens the active material near the surface of the plate. This strain may flake the active material and cause it to fall between the plates or rise with the gas stream. This can cause short circuits between the plates. Vibration and shock loads also contribute to the shedding of active material.

Electrolyte will settle within each individual standing AGM. Sulfuric acid ($H_2SO_4$) has a greater specific gravity than water ($H_2O$) and will settle, over time, to the bottom of a standing AGM. Such settling will cause the lower portion of a standing AGM to have a higher specific gravity than the upper portion of the same AGM. As the acid concentration in the upper portion of an AGM becomes too low, cell resistance increases in that area, allowing preferential discharge to occur in the more conductive areas of the cell. This results in uneven and overdischarge of the paste in the more conductive area. The cell capacity as a whole decreases when electrolyte settles in the individual AGMs.

SUMMARY OF THE INVENTION

The present invention addresses the above problems by disclosing a system that maintains cell integrity within a battery. More particularly, this system maintains integrity by retaining a compressed cell assembly under compression when the battery case expands. The present invention is particularly useful in recombinant lead-acid batteries and may be used with any voltage or number of cells. It has proven to be especially effective in such batteries when used in combination with battery plates and grid elements, such as those disclosed in U.S. Pat. No. 4,865,933, which is incorporated herein by reference.

The present invention in a general aspect ties an assembly of battery plates and separators together under compression and substantially isolates the tied assembly from expansion of the case. Thus, the compressive forces on the assembly, coupled with its substantial freedom from movement relative to the surrounding case, enable the assembly to resist disassembly.

In a preferred form of the invention, the plates and separators are assembled in a stacked relationship with the plates and separators laterally or horizontally disposed. A suitable tying arrangement is then applied to the stack and tensioned so as to compress the stack. The compression is then made permanent by continuing to apply a compressive force, by simply locking the assembly in its compressed condition, or by any other suitable technique.

A tying member may comprise a compression wedge, a single tension member, a cage, or other suitable structure. An example of a cage structure comprises a plurality of tension members and two rigid end plate support members. The end plates compress the separators in the assembly and are held in compression by the tension members. Compression conventionally applied by the walls of the case may now be dispensed with, since the walls no longer keep the plates and separators together. It should be noted, however, that the assembly of plates and separators may still be supported by the case, and anchored or similarly attached to the case. Thus, a compressed assembly may be attached to one wall of the case, or a wall of the case may serve as an end plate for the assembly, without risking disassembly of the plates because of battery case expansion.

Gas produced by charging a battery of the invention escapes from an assembly of the battery plates and separators, while a tying member holds the plate assembly tight. The battery case is now allowed to flex and yield as required under the increased pressure, but the plate assembly remains intact. The tying member effectively prevents or greatly reduces the prospect of the increased gas pressure altering plate to separator compression. The operating efficiency and life of the battery are thereby markedly improved. These effects and results are especially beneficial in VRLABs containing AGMs.

The compressed plate assemblies of the invention may be employed to advantage with the plates arranged side-by-side in a case; however, as noted earlier, they are preferably employed with the plates stacked vertically (plates laying horizontal). The compressed plate assemblies may be employed advantageously with conventional plates; however, they are preferably employed with the woven, composite wire grid plates disclosed in U.S. Pat. No. 4,865,933. The combination of the compressed plate assemblies with the woven, composite wire grid plates has been found to provide batteries with exceptionally good qualities. This is especially the case when plates are horizontally disposed. Battery life and efficiency are particularly outstanding. This technology is especially beneficial in the case of recombinant or sealed batteries (VRLABs).

DESCRIPTION OF PREFERRED EMBODIMENT

Figure 1:
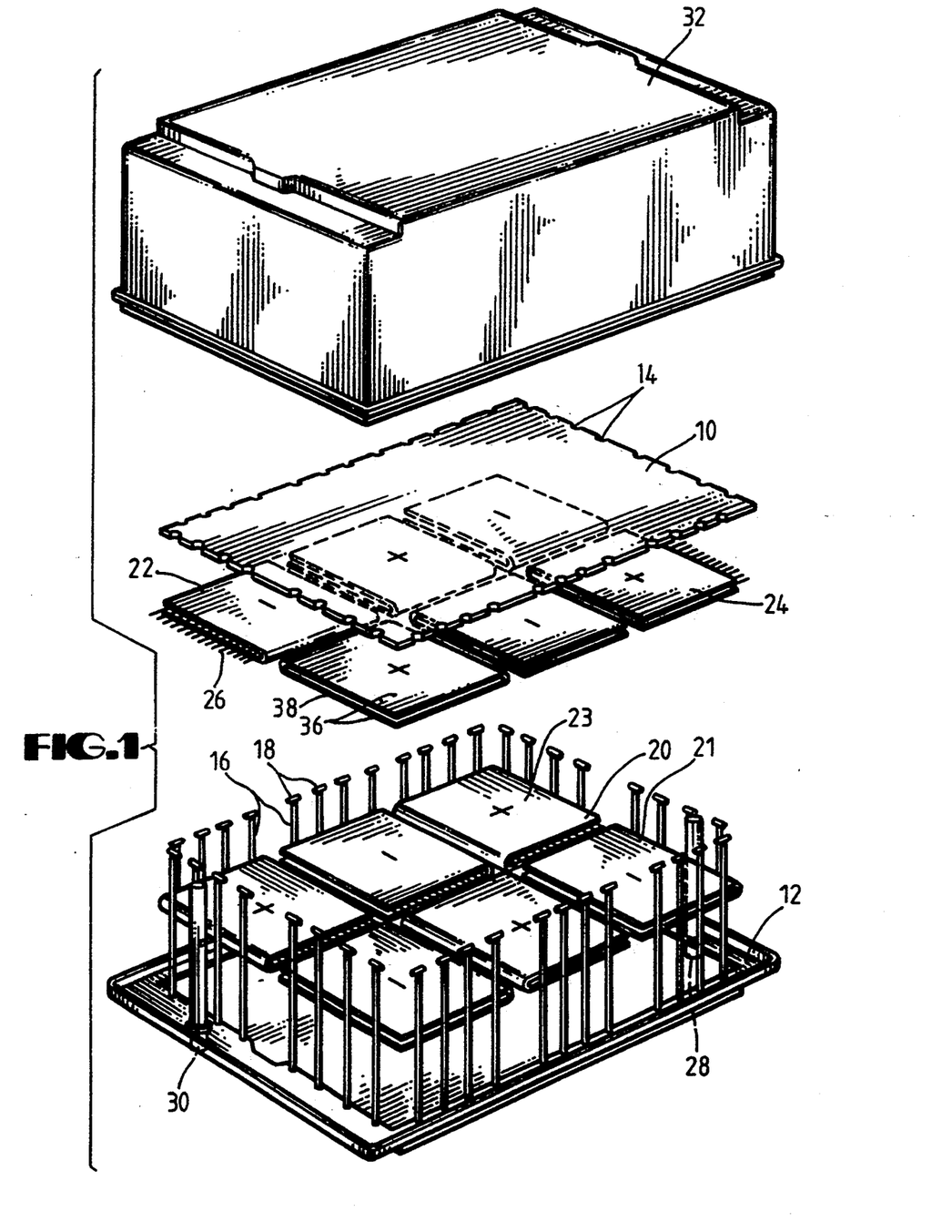
FIG. 1 is an exploded, perspective, schematic view of a tie member assembly using the battery case as a rigid support plate for an assembly of plates and separators in a 12 volt, sealed lead-acid battery.

FIG. 1 shows an exploded perspective view of a preferred tying assembly for compressing an assembly of battery plates. The tying assembly uses the battery case lid 12 as a rigid support plate. The tying assembly comprises rigid support plates 10 and 12, tied together by tensile members 16. This particular type of tying assembly has worked exceptionally well in sealed lead-acid batteries in conjunction with grids woven from lead-coated glass fiber cores. The grids are described in U.S. Pat. No. 4,865,933 which is incorporated herein by reference. The grids have held together very firmly without slippage of the plates with internal gas pressures varying between −3 pigs to +10 pigs during charging, thereby establishing a long battery life.

The grids 38 woven of lead-coated glass fiber cores 26 are pasted with a lead oxide paste (not shown) cut to size and subsequently formed to positive and negative plates in-situ. As shown in FIG. 1, the pasted grids 38 are covered by separators 36. Preferably, each grid 38 is covered, top and bottom, by a separator 36 which wraps around the grid. Preferably, each separator 36 is an AGM. The lead-coated glass fiber cores 26 in the negative half-plates 22 and the positive half-plates 24 protrude from the pasted grids covered by the separators 36. The lead-coated glass cores 26 also protrude from the pasted grid sections of the biplates 20 to form series connections between the positive 23 and negative 21 halves of the biplates 20. Preferably, the grids have about 4 to 10 wires per inch carrying current between the plates. This provides for a low current in each individual conductor and therefore a low corrosion rate in the grids.

The battery plates are stacked vertically and are sized to fit within a periphery defined by the tensile members 16 spaced around the lower end plate 12. The upper end plate 10 is shown to fit within the same periphery on top of the upper battery plates. Stacking the plates, as contrasted to standing the plates, helps the active plate material maintain its structural integrity during gassing. Stacking the plates in accordance with the present invention, also enables oxygen bubbles formed on positive plates to rise perpendicularly to negative plates. This further enables the oxygen to recombine on the negative plate.

The present invention reduces vibration effects by stabilizing the plates within the tying assemblies. Further, the compressed plates do not slip, but instead move as a uniform body within the battery case 32. Stacking the plates also reduces the effects of electrolyte settling.

Figure 2:
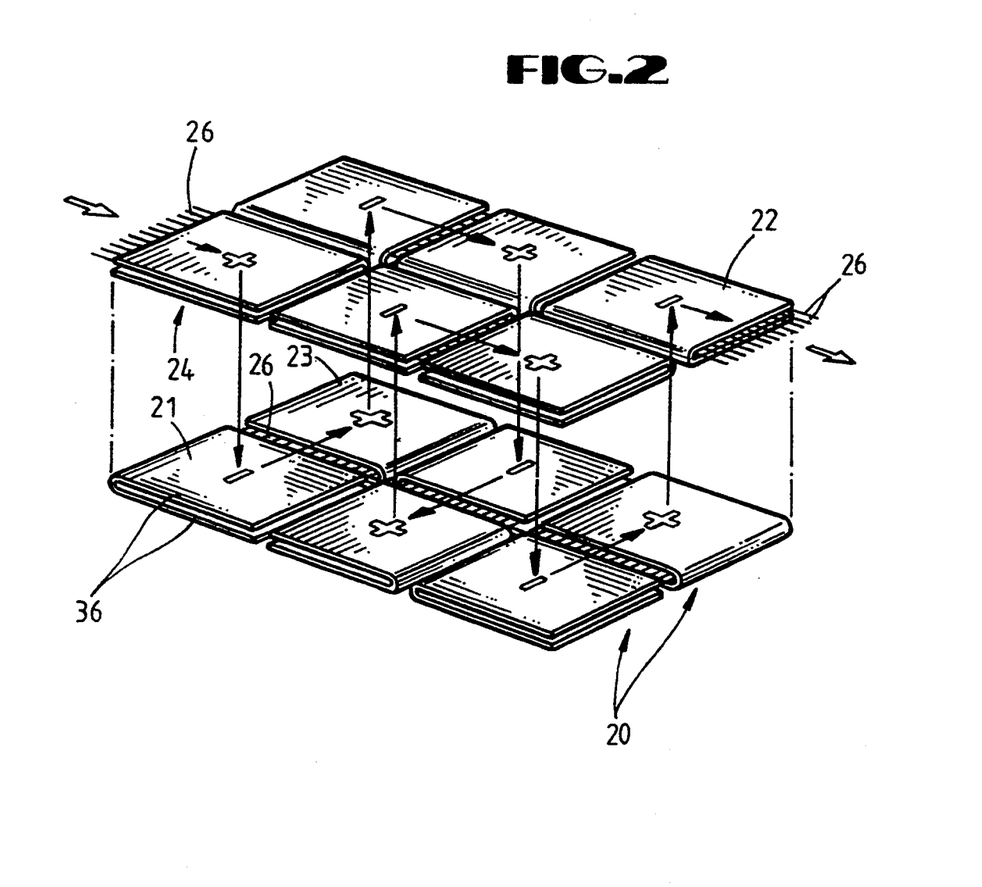
FIG. 2 schematically shows one possible current path through the plates of the battery shown in FIG. 1.

FIG. 2 shows one possible electrical path through the 12 volt lead-acid battery of FIG. 1 having cells arranged in only two layers. The electrical connection is made from a positive battery terminal (not shown) through any bussing means (not shown) to the end wires 26 of the positive half-plate 24. From the positive half-plate 24, the current flows (through ionic transport) down through electrolyte in the pairs of adjacent separators 36 into the lead-coated glass cores of the negative side 21 of the biplate 20. From the negative side 21 of biplate 20, the current flows laterally through the grid's lead-coated connecting wires 26 to the positive side 23 of biplate 20. From the positive side 23 of biplate 20, the current follows a serpentine path as shown through the battery to the negative half-plate 22. From negative half-plate 22, the current flows through end wires 26 and any bussing means (not shown) to a negative battery terminal (not shown).

The "forming" charge is best illustrated by referring to FIG. 1 as well as FIG. 2. A charge to form the battery plates follows a directly opposite path of that previously described. The forming charge is applied to a fully assembled battery and formation is in-situ. The forming charge is connected to the end wires 26 of the battery by means of battery terminals 28 and 30. The charge runs through the battery grids following a serpentine path. The positive plates are formed to a lead dioxide ($PbO_2$) electrode, and the negative plates are formed to a negative sponge lead (Pb) electrode.

During assembly, the battery plates are stacked on support plate 12. Support plate 12 serves as the top of the battery case 32 (the battery is shown inverted). Notches 14 in the rigid support plates 10 and 12 provide connection points for tensile members 16. Tensile members 16 have catches 18 at both ends, which act as locking mechanisms. By locking tensile members 16 to rigid support plates 10 and 12 after the plates have been compressed, the battery plate assembly is held in compression. Preferably, the catches 18 are permanently locked in place by thermal welding after the plates have been assembled and compressed.

Figure 3:
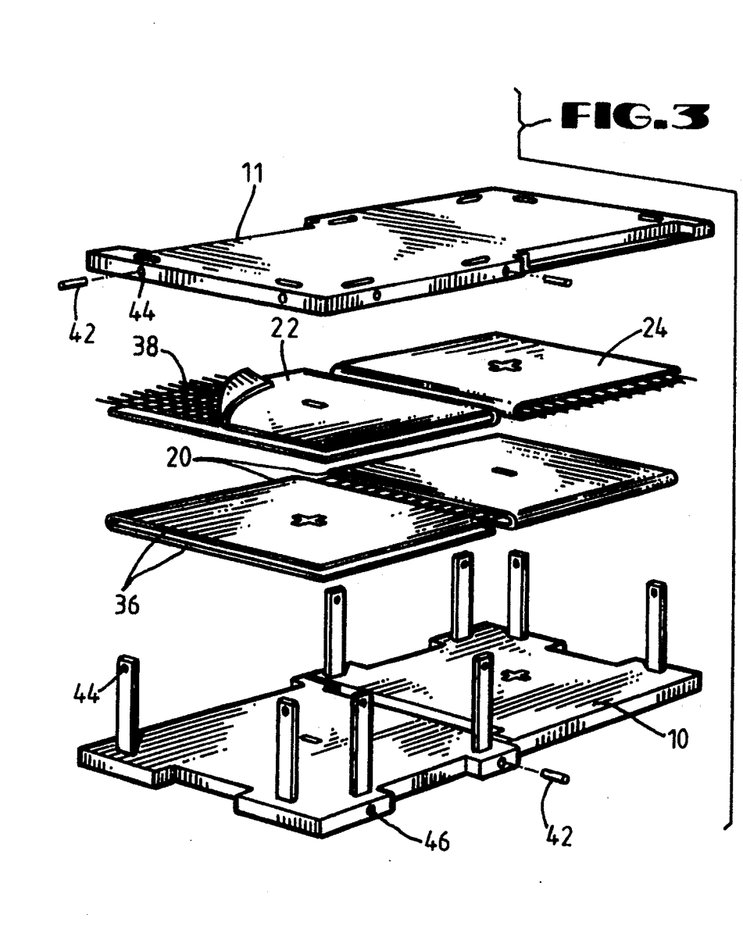
FIG. 3 is an exploded, perspective, schematic view of a tie member assembly and partial plate assembly for a 4 volt lead-acid battery.

Compression of the battery plate assembly may perhaps be described in reference to the four volt lead-acid battery shown in FIG. 3. FIG. 3 illustrates an alternative embodiment of a tying assembly, one which does not utilize one rigid support plate as the top of the battery case. Also, the tying assembly illustrated in FIG. 3 uses locking pins 42 instead of catches 18. The battery plates are stacked on support plate 10 within the periphery defined by the tensile members 16. The tensile members 16 fit within corresponding holes or passageways 40 of the support plates 10 and 11. Support plate 11 is placed on top of the stack of battery plates.

The desired amount of plate assembly compression depends primarily upon the properties and cumulative thickness of the separators in the plate assembly. Thus, it has been found that separators made from AGMs not only possess adequate resiliency for compression but also are excellent reservoirs for battery acid electrolyte. Such mats are available from Hollingsworth & Vose Inc., Lydall Inc., and Wattman Company. The AGMs have a specific compression range in which they will absorb a maximum amount of electrolyte. This compression range may not allow the adjacent battery plates to be spaced as close together as would otherwise be possible.

The compression of the AGMs is governed by these two related concerns. The first concern is the absorption of electrolyte. Preferably, the maximum amount is absorbed. The second concern is the spacing of the battery plates. Preferably, the adjacent battery plates are as close together as possible. The AGMs are accordingly chosen by design thickness and compressed an amount to absorb the required amount of electrolyte, while positioning the opposing battery plates as close together as practical.

Generally, the compression range in most designs of an AGM is between about 10% and about 50% (about 20-30% is generally preferred) of total free glass thickness. For example, in a stack of plates with ten AGM separators of 0.04 inch thickness each, there is a total free glass thickness of about 0.4 inch. A compression of 25% therefore would reduce the total free glass thickness by 0.1 inch. The degree of compression is a function of the resilience of the separators. In general, as noted above, AGMs possess optimum capacity for battery acid electrolyte when they are compressed about 20-30% of their volume.

The compression means may be devised to provide a repeatable compression of the plate assemblies in mass production by at least two different methods. A first method provides a compression stop on the tensile members 16 or the compressing means. Thus, in an embodiment such as that shown in FIG. 3, the degree of compression of the plate assembly is fixed by the relative positions of the matching holes 44 and 46 on the tensile members 16 and the support plates 10 and 11, respectively. By inserting the pins 42 in a matching set of the holes, the tying assembly can provide compression to a fixed thickness, i.e., the battery plates 20, 22, and 24 and separators 36 of a known height can be compressed to a specific lesser height set by the matching holes and the pins 42. The specific height of the compressed plate assembly is designated by the compression stop; and the compression means holds the plate assembly at the designated height while the tying members are locked to hold the assembly in compression. With the tying members secured, the compressive force is released and the assembly is held at the specific height.

A second and preferred method provides compression to a fixed percentage of the total free glass thickness. This method does not require compression stops. The AGM stack is pre-tested to find the force necessary to compress it to a desired total free glass thickness. Thereafter, a suitable compression means such as a weight or a hydraulic ram or press may be used to supply this amount of force. The stack is held by this force and the tying assembly is locked, preferably by heat welding tensile members 16, to end plates 10 and 12. With the tensile members secured, the compressive force is released and the assembly is held at a specific total free glass thickness.

Figure 4:
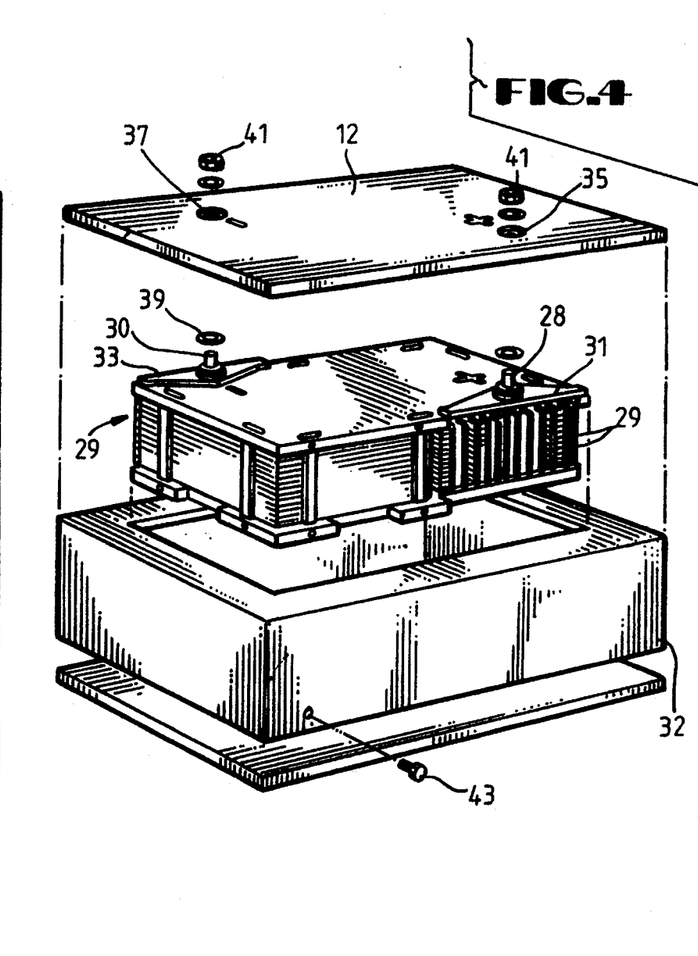
FIG. 4 shows an exploded, schematic view of the tie member assembly and plate assembly of FIG. 3 inside a battery case.

After the tying assembly or assemblies have been locked, the battery case 32 may be placed around the assembly and sealed by any means, preferably by thermal welding. FIG. 4 shows an exploded, perspective, schematic view of the tie member assembly and plate assembly of FIG. 3 inside a battery case.

FIG. 4 shows an alternative terminal connection. The bus wires 29 connect to positive collection plate 31 and negative collection plate 33. The collection plates 31 and 33 connect to positive terminal and negative terminals 28 and 30, respectively. Terminals 28 and 30 protrude through apertures 35 and 37, respectively, in the top of the battery case. O-rings 39 form a seal around the apertures 35 and 37 and the terminals are secured by nuts 41.

After thus forming a sealed battery, the battery case 32 may be filled in a vacuum or at ambient atmosphere pressure with a sulfuric acid and water electrolyte. After adding the electrolyte, the battery plates are formed in-situ by connecting a forming charge to the battery terminals and a safety valve 43 is secured into the battery case. Battery case, tensile members, and end plates and pins may be made of polypropylene, reinforced plastic, fiber reinforced plastic, or other suitable materials. It will be understood by those skilled in the art that the battery plates could be formed before assembly.

Figure 5:
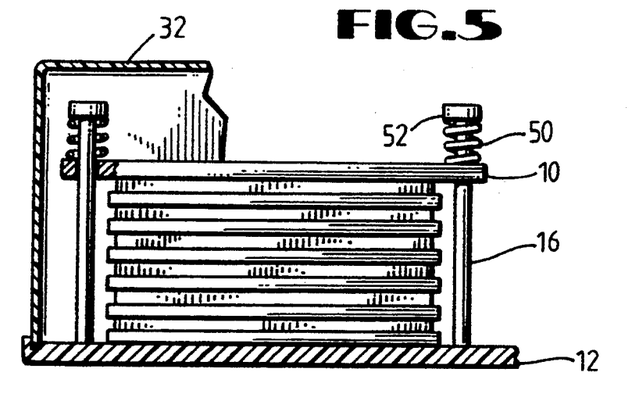
FIG. 5 is a schematic, partially sectioned and fragmented side view of a battery case surrounding a plate assembly using one battery case wall as a rigid support member and compression springs to provide a continuous tying force to the plate assembly.

FIG. 5 illustrates an alternate embodiment of the invention employing compression springs 50 to provide a continuous force on the plate assembly. The compression springs 50 may be used in conjunction with one or more tensile members 16 having spring seats 52.

A spring in a tie member assembly is advantageous in that it helps to compensate for possible settlement of plates or separators during the life of a battery. A spring also helps to compensate for variations in the thickness of the plates and separators. A spring-generated compressive force provides a structure that takes up the slack as the plates and separators settle in and lose some of their initial assembly compression. The result is closer and more consistent plate spacing with less internal voltage drop during the life of a battery or cell.

Figure 6:
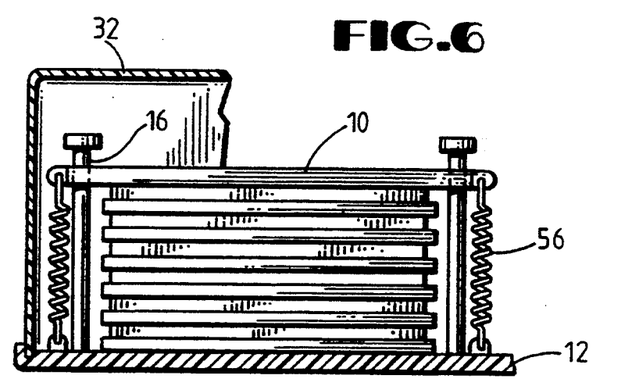
FIG. 6 is a schematic, partially sectioned and fragmented side view of a battery case surrounding a plate assembly using one battery case wall as a rigid support member and tension springs to provide a continuous tying force to the plate assembly.
Figure 7:
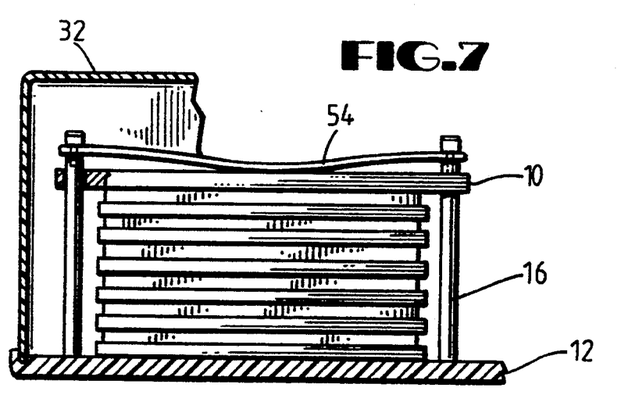
FIG. 7 is a schematic, partially sectioned and fragmented, side view of a battery case surrounding a plate assembly using one battery case wall as a first support member and a leaf spring applying a compressive force to a second support member to provide a continuous tying force to the plate assembly.

Several types of springs may be used in such a structure. FIG. 6 shows a tying assembly utilizing tension springs 56 to compress an assembly of plates. As shown, tension springs 56 may be substituted for one or more tensile members 16. FIG. 7 shows a leaf spring 54 applying a compressive force to rigid support plate 10. Leaf spring 54 may be employed at either end of the plate assembly with or without tensile members 16 and may be adapted to serve as a wall or the lid of the battery case 32. A support plate 10 may be made by molding plastic material around a leaf spring (spring internal to the plastic 10) before assembly and be prestressed so that the support plate becomes flat when the proper compression force is applied.

In all embodiments using springs, the springs may be metal, stainless steel, plastic, rubber, fiber, elastic, or any suitable material. Springs made of metal or fiber may have injection molded plastic surrounding the springs.

Figure 8:
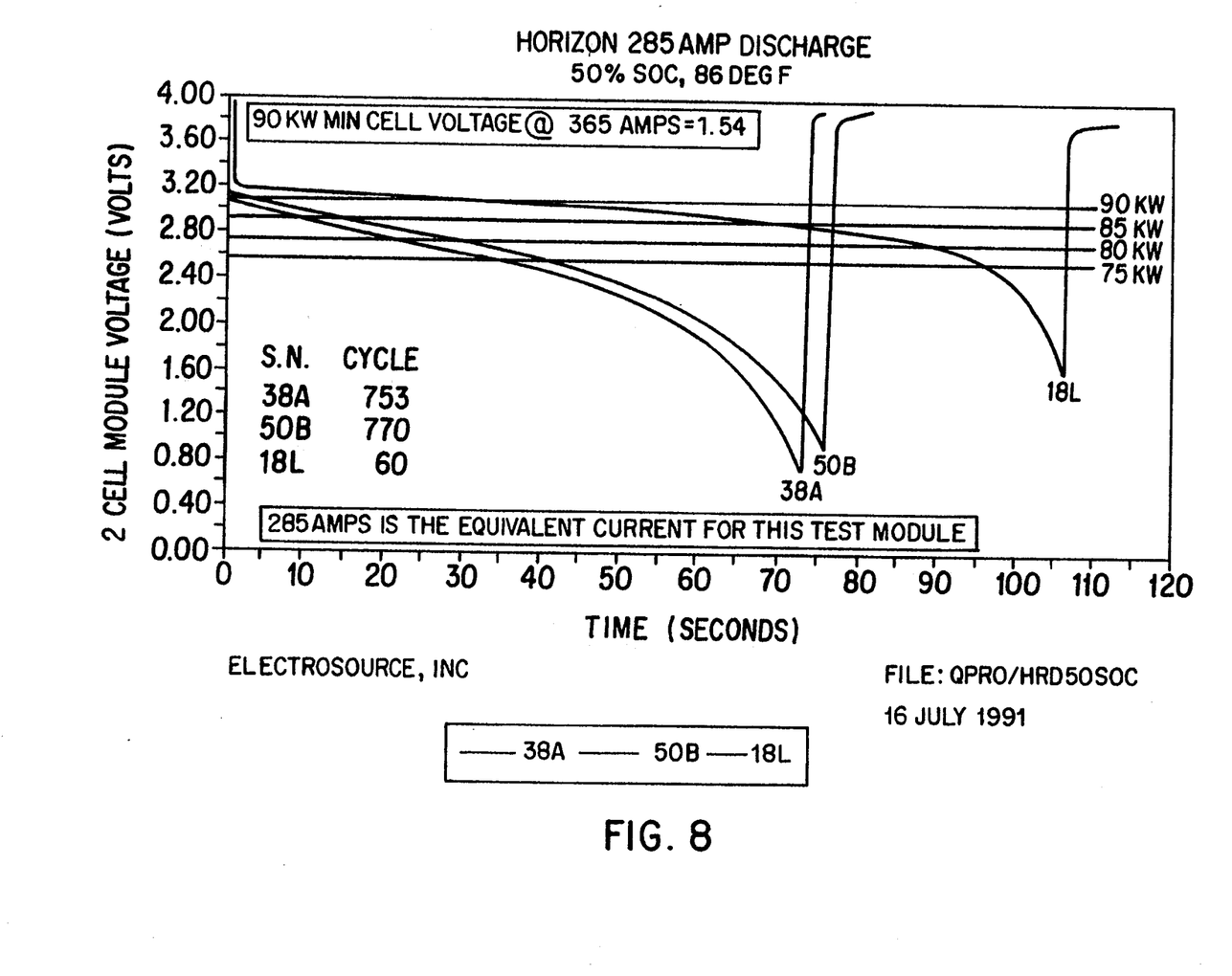
FIG. 8 is a graphical representation of a 285 amp discharge of batteries utilizing the present invention.

FIG. 8 is a graphical representation of a 285 amp discharge of batteries utilizing the present invention. The graph illustrates that batteries utilizing the present invention maintain around 90% of their original peak power (W/Kg) after more than 750 two-hour C/2 discharges (80% DOD).

Although particular detailed embodiments of the method and apparatus have been described herein, it should be understood that the invention is not restricted to the details of the preferred embodiment. Many changes in design, configuration, and dimension are possible without departing from the spirit and scope of the instant invention.

What is claimed:

1. A valve regulated, sealed lead-acid storage battery comprising:
   a battery case including at least one internal surface;
   an assembly of alternating positive and negative plates and compressible separators between adjacent said plates; and
   a tensioned locking assembly supported from said surface adapted to hold the assembly of plates together with the separators compressed and with the assembly of plates sufficiently isolated from the remainder of the battery case to resist disassembly of the assembly of plates upon expansion of the battery case.

2. The storage battery of claim 1, wherein the separators comprise fiberglass mats.

3. The storage battery of claim 2, wherein the locking assembly further comprises a separate end plate at each end of the assembly of plates.

4. The storage battery of claim 3, wherein one of the end plates comprises one end of the case.

5. The storage battery of claim 3, wherein the locking assembly further comprises at least one tensile member interconnecting the end plates under tension.

6. The storage battery of claim 5, wherein at least one tensile member comprises a spring tensioned to draw the support plates together.

7. The storage battery of claim 4, wherein the locking assembly further comprises at least one spring tensioned to draw the support plates together.

8. A method of maintaining compression on a stack of battery plates and separators in a battery case comprising:
   assembling a stack of alternating positive and negative plates, with a permeable separator material separating each pair of adjacent plates on a rigid support;
   applying a continuing tensile force to the assembled stack of plates so as to permanently compress the stack;

9. A sealed lead-acid storage battery comprising;
   a case including four side walls, a top and a bottom; and
   a permanently compressed assembly of alternating positive and negative plates with compressible separators between the plates, said assembly being anchored within the case to a single one of the side walls when the plates are vertically disposed, or to the top when the plates are laterally disposed, so as to move upon expansion of the case as a uniform body with said one wall, or with said top, depending on the disposition of the plates, in substantial isolation from the remainder of the case so as to resist disassembly of the compressed assembly.

10. The storage battery of claim 1, wherein the locking assembly comprises support plates positioned at opposite ends of the assembly of plates and tied together under tension sufficient to compress the separators.

11. A valve regulated, sealed lead-acid battery comprising:
    a battery case comprising four sidewall surfaces, and top and bottom surfaces;
    an assembly of alternating positive and negative plates and compressible separators between adjacent said plates disposed within the battery case; and
    a locking assembly supported by one of said surfaces and adapted to lock the assembly of plates together under tension sufficient to compress the separators and with the locked assembly of plates sufficiently isolated from the remainder of the battery case to resist disassembly of the locked assembly upon expansion of the case.

12. The storage battery of claim 10, wherein the surface is the bottom surface, and the locking assembly comprises support plates positioned at opposite ends of the assembly of plates and tied together under tension sufficient to compress the separators.

* * * * *

UNITED STATES PATENT AND TRADEMARK OFFICE
CERTIFICATE OF CORRECTION

PATENT NO. : 5,409,787
DATED : April 25, 1995
INVENTOR(S) : Richard J. Blanyer and Benny E. Jay It is certified that error appears in the above-indentified patent and that said Letters Patent is hereby corrected as shown below:

Column 4, line 15, "3 pigs" should be --3 psig-- and "10 pigs" should be --10 psig--.

Claim 8, column 8, line 24, after "stack;" add

--supporting the permanently compressed assembly from an internal surface of the battery case in sufficient isolation from the remainder of the battery case to resist decompression of the compressed assembly; and sealing the supported assembly of plates inside the battery case.--

Claim 12, column 8, line 58, "10" should be --11--.

Signed and Sealed this

Fifth Day of September, 1995

Attest:

BRUCE LEHMAN

Attesting Officer     Commissioner of Patents and Trademarks